United States Patent [19]
Pyle

[11] 3,977,947
[45] Aug. 31, 1976

[54] FLUIDIZED BED CARBONIZATION

[75] Inventor: Owen Pyle, Anchorage, Ky.

[73] Assignee: The Kingsford Company, Louisville, Ky.

[22] Filed: May 25, 1973

[21] Appl. No.: 364,135

Related U.S. Application Data

[63] Continuation-in-part of Ser. No. 275,366, July 26, 1972, abandoned, and a continuation-in-part of Ser. No. 347,993, April 5, 1973, Pat. No. 3,938,965, which is a continuation-in-part of Ser. No. 279,767, Aug. 11, 1972, Pat. No. 3,950,143, which is a continuation-in-part of Ser. No. 271,795, July 14, 1972, Pat. No. 3,852,248.

[52] U.S. Cl. .................................... 201/27; 201/28; 201/29; 201/31; 201/37; 202/121; 48/111; 432/15; 432/58
[51] Int. Cl.$^2$ .................. C10B 47/00; C10B 21/18; C10B 1/04; C10J 3/00
[58] Field of Search .................. 201/25, 20, 12, 27, 201/28, 29, 31, 36, 37; 202/121; 44/1 E, 1 F, 10 C, 10 K; 48/209, 111, 63; 23/288 S; 34/10, 57 R, 57 A; 432/15, 58

[56] References Cited
UNITED STATES PATENTS

| | | | |
|---|---|---|---|
| 1,084,175 | 1/1914 | Thomas | 432/58 |
| 2,537,153 | 1/1951 | Nelson et al. | 201/27 |
| 2,715,018 | 8/1955 | Lapple et al. | 23/288 S |
| 2,871,004 | 1/1959 | Gorin | 432/15 |
| 3,040,439 | 6/1962 | Frost | 23/288 S |
| 3,436,314 | 4/1969 | Leonor | 201/25 X |
| 3,660,245 | 5/1972 | Zelnik et al. | 201/31 |
| 3,723,395 | 3/1973 | Warzell | 34/10 |

FOREIGN PATENTS OR APPLICATIONS

| | | |
|---|---|---|
| 517,539 | 10/1955 | Canada |
| 595,005 | 3/1960 | Canada |
| 828,063 | 11/1969 | Canada |
| 888,090 | 12/1971 | Canada |
| 964,241 | 1/1950 | France |

Primary Examiner—Jack Sofer
Attorney, Agent, or Firm—LeBlanc & Shur

[57] ABSTRACT

A continuous process is described whereby particulate woody materials are carbonized in a fluidized bed to form solid and gaseous fuel. The process includes injecting particulate woody materials, on a continuous basis, into a fluidized bed of previously carbonized material. Off-gas from carbonization with entrained charcoal fines is continuously removed from above the bed, and coarse charcoal is continuously removed from the surface of the bed. If desired, a high ash, coarse fraction may also be continuously removed from immediately above the bed grid. The off-gas and entrained fine charcoal are separated in a cyclone system, and the charcoal fines with the coarse charcoal fraction from the bed surface are collected for use as solid fuel. Off-gas from the separator may be scrubbed, if desired, or utilized directly as an enriched gaseous fuel. Alternate embodiments of the apparatus of this invention include an oval-shaped bed, or a toroidal bed with a plurality of feeders disposed at preselected positions extending into the bed to maximize the efficiency of the bed.

11 Claims, 3 Drawing Figures

FLUIDIZED BED CARBONIZATION

This application is a continuation-in-part of my copending application Ser. No. 347,993, filed Apr. 5, 1973, now U.S. Pat. No. 3,938,965, issued Feb. 17, 1976, entitled IMPROVED PROCESS FOR PRODUCING SOLID INDUSTRIAL FUEL which application is a continuation-in-part of my copending application Ser. No. 279,767, U.S. Pat. No. 3,950,143, filed Aug. 11, 1972, issued Apr. 13, 1976, entitled PROCESS FOR PRODUCING SOLID INDUSTRIAL FUEL, which application is a continuation-in-part of my copending application Ser. No. 271,795, filed July 14, 1972, entitled PROCESS FOR PRODUCING INDUSTRIAL FUEL FROM WASTE WOODY MATERIALS now U.S. Pat. No. 3,852,248, issued Dec. 3, 1974. This application is also a continuation-in-part of my copending application Ser. No. 275,366, filed July 26, 1972, now abandoned and entitled EFFICIENT PRODUCTION OF BRIQUETTE QUALITY CHARCOAL IN MULTIPLE HEARTH FURNACES.

This invention relates to the production of fuel, and specifically to an improved process for the preparation of solid, industrial fuel, gaseous fuel, briquette-quality charcoal, or low volatile charcoal in a fluidized bed carbonizer.

In addition, this invention relates to a relatively pollution-free method for disposing of waste woody materials by converting these materials to industrial fuel which can be burned without creating appreciable sulphur dioxide or noxious or visible smoke, and will produce a nonabrasive ash which can be economically collected with conventional emission control devices. This invention is also related to lowering the ash content of charcoal used for the production of barbecue briquettes.

The term "woody" is employed herein broadly to include vegetable materials characterized by a cellulosic fiber structure. The term is intended to include materials such as bark, twigs, sawdust, nut shells such as walnut shells, fruit pit shells such as almond shells and peach pit shells, pods and hulls such as peanut shells, cobs and the like. The term is also intended to include processed cellulosic materials such as molded pulp containers, corrugated paper board, paper, softboard, hardboard, extracted stumps, baggasse rope, jute and other carbonizable materials of vegetable origin.

Utilization as an inefficient fuel and/or incineration have been usual industrial methods for disposing of waste woody materials. These methods, however, present certain problems because they are expensive and, unless carried out with elaborate safeguards, the air emissions produced are environmentally unacceptable. These methods also are a poor utilization of a valuable natural resource. In my patent application Ser. No. 347,993 it was noted that modern air emissions standards now require the use of expensive devices on the boiler stacks in incinerators to control fly ash emissions. These devices typically include a plurality of relatively small cyclones arranged either in series or in parallel to separate the entrained ash from stack gases when woody materials are incinerated.

Although cyclone type devices may be highly efficient, in actual practice when operated at an efficiently high gas velocity the abrasive quality of the ash collected causes excessive wear and requires frequent maintenance and shut-down. Accordingly, the operation of emission control devices on conventional burners, fuelled by waste or other woody materials, may be characterized by unacceptably high maintenance costs and down-time.

In the above-mentioned application an improved process for disposing of waste woody materials by carbonizing the materials was described. After initially carbonizing the waste woody materials, a dense fraction of foreign materials was separated from a fuel fraction, and the latter then was available for use as a low sulphur fuel to produce, when consumed, ash having a low abrasive quality.

Specifically, the process of the above prior application was adapted to be utilized with any conventional carbonizer to produce charcoal. The charcoal leaving the carbonizer was first cooled and conditioned against spontaneous combustion and then classified on the basis of density to remove a dense fraction which has been found to contain highly abrasive foreign materials. Typically the dense fraction discarded constitutes from 5 to 25% of the crude charcoal.

The aforementioned foreign materials are derived as follows. Green bark contains inherent as well as adherent sand and other foreign materials which cannot be efficiently separated therefrom before the bark is charged to a burner. The inherent portion has been deposited as the tree has grown in crack, pinholes, and crevices and wounds in the bark by wind, water and other means. Subsequent growth of the tree therefor occludes the deposits. Sawdust, another common waste used as fuel, may have dense foreign materials such as sand mixed therein. These materials may not be removed economically before incineration. However, these materials may be readily removed from the charcoal produced.

Accordingly, the disclosure of my U.S. patent application Ser. No. 347,993, filed Apr. 5, 1973, is hereby incorporated by reference.

In my aforementioned parent application Ser. No. 271,795 there was described a process whereby waste or other woody materials are initially dried, until the moisture content therein is less than about 15%, and subsequently carbonized. These materials are thereby used to produce a solid industrial fuel, charcoal, and an off-gas which may have a fuel value similar to or higher than producer gas. The charcoal is then pulverized, if desired, and cooled and conditioned against spontaneous combustion. The charcoal may be used to adsorb the combustible condensible matter in the gas to produce an enriched charcoal and a relatively non-corrosive fuel gas. In the alternative, pulverized charcoal may be entrained in the gas and conveyed directly to a burner for use as an enriched fuel gas.

Accordingly, the disclosure of my U.S. patent application Ser. No. 271,795, filed July 14, 1972, is hereby incorporated by reference.

In my prior application Ser. No. 279,767 a process for producing solid, low sulphur industrial fuel having a fuel value similar to bituminous coal is described. The process includes the steps of initially drying waste or other woody materials, and subsequently subjecting the materials to limited carbonization only until noticeable carbonization begins and the fiber structure of the materials disappear. This process maximizes the fuel value of the solid charcoal produced and produces only a minimum quantity of off-gas.

The invention described in the aforementioned application was also directed to production of a relatively pollution-free industrial fuel from waste or other woody materials which can then be burned as fuel without creating appreciable sulphur dioxide or noxious or visible smoke. The term "Pyrochar" was employed therein to include, broadly, as well as partially carbonized woody materials, pyrolyzed at least sufficiently to destroy its fibrous character. The term is applicable to a product of carbonization having a relatively high content of volatile combustible matter, but which may be pulverized by conventional milling techniques.

The process of this prior patent application also includes a step of initially drying the waste woody materials and then feeding the dried materials into a carbonizer. However, in my last-mentioned prior application limited carbonization is used to produce Pyrochar in high yields. The Pyrochar produced is then quench-cooled and conditioned against spontaneous combustion, and may subsequently be compacted for shipment or pulverized for immediate use as a powdered fuel. The process may produce a limited amount of off-gas if desired, useful as fuel for the dryer.

Accordingly, the disclosure of my U.S. patent application Ser. No. 279,767, filed Aug. 11, 1972, is hereby incorporated by reference.

In my prior application Ser. No. 275,366 there was described an efficient and economical process for producing briquette-quality charcoal, having from about 10 to no more than about 23% volatile combustible matter from particulate vegetable material in a multiple hearth furnace. If the vegetable material has a high moisture content, the process includes the step of initially drying the materials so that the feed to the multiple hearth furnace has a moisture content of no more than about 20% and preferably from 5 to 10%. The materials are then carbonized in the furnace, and the charcoal produced is immediately stabilized against spontaneous combustion by quench-cooling and conditioning with agitation. The off-gas produced is available for use as a fuel and has been found to have a fuel value of at least 100 B.t.u. per standard cubic foot. The charcoal produced is immediately quenched preferably with a water spray and thereby cooled and conditioned against spontaneous combustion by agitation.

In order to make barbecue briquettes the charcoal is conveyed to a mixer. A starch gel formed with water in, for example, a steam jet cooker is then added to the charcoal as a binder to form a mix, and the mix is conveyed to a suitable compaction device for forming briquettes. Although an extruder could be used, it is preferred to utilize a roll briquetting machine to form the briquettes. Because the briquettes formed have a high water content from the gel binder, they must then be conveyed to a dryer. The dryer may be any conventional drying device, and the briquettes are heated in the dryer until they have a moisture content of about 5% or less. After drying the briquettes may be packaged for sale utilizing well known procedures.

Accordingly, the disclosure of my U.S. patent application Ser. No. 275,366, filed July 26, 1972, is hereby incorporated by reference.

As is well known in the art, a fluidized bed may be adapted to carbonize a wide variety of particulate materials. For example, in U.S. Pat. No. 3,184,397 to Work et al a fluidized bed is utilized to carbonize pulverized coal. In U.S. Pat. No. 2,676,365 to Shirai et al a fluidized bed with a mechanical agitator is utilized to prepare acticated carbon by carbonizing and subsequently activating predried sawdust impregnated with a reactive mineral reinforcing agent. In addition, it is also known that an inert bed of, for example, sand, may be utilized to carbonize woody materials.

However, fluidized bed carbonization of particulate wood or woody waste materials such as sawdust, milled bark, and the like to produce fuel has not found industrial application because it is difficult, bordering on the impossible, and industrially impractical to implement dense phase fluidization of a bed of particulate woody material unless its character is completely changed as by impregnation described in the Shirai et al patent. In addition, while particulate charcoal may be fluidized in a continuous process, attrition of the particles usually results in excessive decrepitation into fines which rapidly go into a dispersed phase entrainment with the off-gas.

It has now been discovered, however, that fluidized bed pyrolysis of particulate woody materials or other difficultly fluidizable but carbonizable solids may be implemented on an industrial basis by continuously injecting them into a hot fluidizing bed of newly formed charcoal without predrying the feed materials. A fluidized bed carbonizer, in contrast to a multiple hearth furnace, is a highly efficient drier. Therefore the feed need not be predried in order to implement fluidized bed carbonization on an industrially efficient basis unless off-gas having a relatively high fuel value is desired.

According to the process of this invention, coarse charcoal may then be continuously removed from the surface of the dense phase, a highly abrasive fraction may be elutriated continuously from the bottom of the bed just above the grid, and the fines in the dispersed phase may be continuously collected in for example a cyclone system to produce, as desired, low volatile charcoal having less than 10% volatile combustible matter (VCM), briquette quality charcoal having from 10 to 23% VCM, or high volatile charcoal having over 23% VCM hereinafter referred to as Pyrochar.

In addition, if desired, the off-gas from carbonization may be conveyed to a burner for use as an enriched gaseous fuel, or the water in the gas may be condensed and the gas scrubbed and stored for use as a fuel. The fuel value of the off-gas will depend, as will be subsequently explained, on the carbonization procedure utilized.

Furthermore, a portion of the off-gas may be recycled with a hot gas blower for utilization in the fluidized bed, or the condensible combustible matter in the gas may be adsorbed on the charcoal produced to reduce the corrosiveness of the gas and to produce an enriched solid fuel.

Whether low volatile charcoal, briquette quality charcoal, or Pyrochar is formed according to the process of this invention will depend on the temperature and average residence time in the fluidized bed which may be regulated by the flow rate of burner air and feed rate according to procedures will known in the art. In must be noted that it is impossible to establish "plug" flow in a continuous fluidized bed process. Therefore an average flow rate through the system will be established.

Accordingly it is an object of this invention to provide an improved and economical process for producing fuel from woody materials.

It is another object of this invention to provide a process for producing virtually non-polluting solid industrial fuel from woody materials, which fuel, when burned in conventional equipment will emit a fly-ash which may be economically collected from stack gas with conventional dry emission control devices.

It is yet another object of this invention to provide an industrially efficient process for carbonizing particulate woody materials in a fluidized bed to provide solid industrial fuel, briquette quality charcoal, or low volatile charcoal useful for metallurgical purposes or for activation.

It is yet another object of this invention to provide a process for reducing the abrasiveness of the fly-ash resulting from the combustion of woody materials so that the ash may be economically and efficiently collected from boiler stack gases.

It is yet another object of this invention to provide an efficient and economical process for producing briquette quality charcoal having a relatively low ash content for use in making barbecue briquettes.

It is yet another object of this invention to provide an improved process for producing virtually non-polluting solid industrial fuel from woody materials, which fuel is characterized by combusting with a radiant flame and by producing a relatively non-abrasive fly-ash, when consumed, which process includes carbonizing the materials in a fluidized bed to produce coarse charcoal, fine charcoal, and an off-gas, said charcoal having been beneficated to remove a dense fraction of coarse abrasive material therefrom.

It is still another object of this invention to provide an improved process for producing virtually non-polluting solid industrial fuel from woody materials which fuel will combust with a radiant flame, and which process includes the steps of subjecting said materials to at least a limited carbonization in a fluidized bed of previously carbonized charcoal, on a continuous basis, until the fiber structure thereof is destroyed; removing a coarse charcoal fraction on a continuous basis from the surface of the dense phase; removing fine charcoal from a dispersed phase thereof; and collecting the charcoal products for use as an industrial fuel which will produce, when burned, a relatively non-abrasive fly-ash which may be economically and efficiently collected from boiler and other furnace stack gases.

It is still another object of this invention to provide an improved fluidized bed apparatus for carbonizing particulate woody material whereby said material is injected on a continuous basis through said entering feeders substantially into a fluidized bed immediately above the grid plate thereof, said bed comprising newly formed charcoal, and removing on a continuous basis from the surface of the dense phase coarse charcoal and from the dispersed phase fine charcoal in a separator such as a cyclone.

These and other objects will become readily apparent with reference to the drawings and following description wherein.

Figure 1:
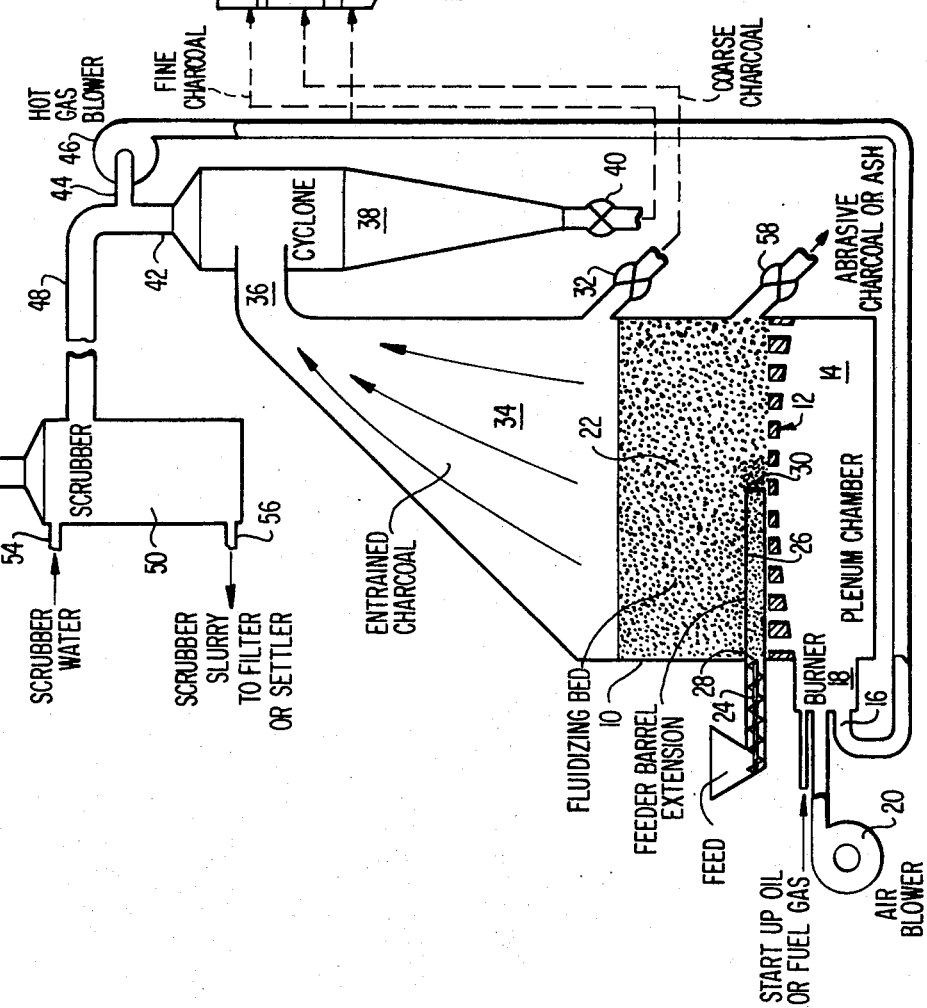
FIG. 1 is a schematic drawing of a preferred embodiment of the fluidized bed carbonizing apparatus of this invention.

With attention to the drawings, FIG. 1 is a schematic representation of an embodiment of the fluidizing bed carbonization apparatus of this invention. The apparatus includes a closed vessel 10 having an interior grid 12 disposed above a plenum chamber 14. A fluidized bed may be established in a vessel having a conical or inverted conical bottom. However, it is preferred in this invention to use a vessel having a flat or relatively flat, porous grid.

Recycled, hot off-gas from carbonization enters the plenum chamber 14 at inlet 16. A start-up burner 18 is disposed at an opposite end of chamber 14, and air is admitted from blower 20 through burner 18 so that initially hot air is forced into the chamber 14, upwardly through the grid 12, to fluidize the bed 22.

Feed is admitted to the vessel 10 through a conventional screw conveyor 24. However, in the preferred embodiment of this invention a barrel extension 26 is provided at the vessel inlet 28 so that feed will be admitted at inlet 30 to bed 22 immediately over the center of grid 12.

In order to efficiently carbonize with maximum bed area utilization, a fluidized bed depth of at least 2 feet and preferably 3 feet is desirable. Bed depths of 6 feet or more may be employed, but it should be noted that for maximum bed utilization the horizontal distance from the feed inlet 30 to the vertical walls of vessel 10 should not exceed the bed depth. If this horizontal distance exceeds the depth, the excess area will be unused. Accordingly, with feeder barrel extension 26 the effective horizontal bed area may be doubled for a given fluidizing bed depth.

The feed entering conveyor 24 should be particulate woody materials such as sawdust, milled bark, and the like. Preferably the particles will be small enough to pass through about a ¼ inch screen, but larger particles could be utilized. The feed in the preferred embodiment may be through ¼ inch screen × 0 indicating that it will contain a substantial amount of fines.

The feed is continuously injected into the dense phase of the fluidizing bed 22. As the feed carbonizes coarse charcoal may be removed through outlet 32, and the fines will enter a dispersed phase in the area 34 above the dense phase. Fine charcoal particles entrained in the off-gas from carbonization will be continuously removed from vessel 10 at outlet 36 and conveyed to a conventional separator system, such as cyclone 38. The fine charcoal particles removed from the off-gas in cyclone 38 are collected at outlet 40.

The coarse charcoal from outlet 32 and fine charcoal from outlet 40 may then be collected and conveyed to a cooler for conditioning and stabilizing against spontaneous combustion. The off-gas from cyclone 38 exiting at outlet 42 may may be recycled by conduit 44 to hot gas blower 46 for reinjection through inlet 16 into burner 18 as a primary fuel. If desired, a portion of the gas may be routed from outlet 42 through conduit 48 to a cleaning device 50.

Cleaning device 50 could be a scrubber utilizing water to form a slurry of the solid particulate matter remaining in the gas and the scrubbed gas could then be collected at scrubber outlet 52. The water entering scrubber 50 through inlet 54 would exit at outlet 56 as a slurry which may then be conveyed to a filter or settler (not shown). Other well known gas cleaning techniques could be substituted for scrubber 50.

In the alternative the gas from outlet 48 may be conveyed directly to a burner for use as an enriched fuel gas. An abrasive fraction of coarse charcoal or ash, which may be about 5 to 25% of the crude charcoal produced in vessel 10 may be continuously elutriated from above the grid 12 at outlet 58. The fraction exiting at outlet 58 contains rejects to be discarded.

To begin carbonizing with the apparatus of FIG. 1 supplementary start-up gas or oil is ignited in burner 18 with air from blower 20 and the resulting hot gas passes through chamber 14 to preheat vessel 10. A charge of charcoal is fed into the vessel 10 to establish a fluidized bed 22. Particulate woody material is then injected into the bed by feeder 24 on a continuous basis.

Once carbonization has begun in the bed, use of start-up oil or fuel gas in burner 18 is discontinued, and the exothermic pyrolyis reaction is permitted to supplement the heat required. A portion of the off-gas from carbonization is recirculated with blower 46 to burner 18 as the primary fluidizing medium; and only a measured quantity of air is injected through blower 20 to control the temperature within the bed 22.

The superficial velocity of the gas required to fluidize the bed will vary with the nature of the material being carbonized and many other factors as are well known to those skilled in the art. Typically, however, a superficial velocity of 1 foot per second may be utilized. The temperature of bed 22 is controlled, at a given feed rate, to produce, as desired, low volatile charcoal, briquette quality charcoal, or Pyrochar. For example, if a temperature of at least about 600°F. and preferably between about 600° and 800°F. is maintained within the fluidized bed 22, the device of this invention may be utilized to produce Pyrochar. If the temperature within the bed is maintained at between about 800°F. and 1200°F. briquette quality charcoal may be produced. Finally, if the bed temperature is maintained high than about 1200°F. low volatile charcoal may be produced which is useful for metallurgical purposes or for subsequent conversion to active carbon.

As noted above only an average residence time in the bed can be established. "Plug" flow is impossible in a continuous fluidized bed. Average residence time will vary with particle size and wetness. For example, with air dried wood containing about 12% moisture in particles passing through a 6 mesh screen, the average residence time will be about 5 minutes in a bed having a temperature of about 1000°F. to produce briquette quality charcoal.

In my aforementioned patent application the off-gas produced by carbonization may have considerable fuel value, depending primarily on the moisture content of the material charged to the carbonizer, and the temperature maintained within the fluidizing bed. For example, from a total feed heat value of 7,000,000 B.t.u.'s, gas yielding a fuel value of about 450 B.t.u. per standard cubic foot (scf) may be recovered from a ton of relatively dry (5% moisture) clean wood being converted to a briquette quality charcoal. However, a ton of wet green bark assaying 10% ash at about 15% moisture being converted to low volatile charcoal might yield a gas having a total heat value of less than about 1,000,000 B.t.u.'s in dilution too great to be useful as a fuel.

If a multiple hearth furnace is used for carbonization it is desirable to predry the charge in order to increase the capacity of the furnace whether the off-gas is to be used as a fuel or not.

A fluidized bed, in contrast to a multiple hearth furnace, is an efficient dryer. Therefore predrying the feed is not essential to the efficient production of solid fuel. However, if the off-gas is an important product the feed should be predried as in my above prior applications to reduce dilution of the off-gas.

If the off-gas has practically useful value, e.g., more than about 100 B.t.u.'s per scf, and is to be burned in the immediate vicinity, the gas cleaning device 50 may be eliminated and the gas from conduit 48 may be conveyed directly to a burner (not shown) for use as a fuel gas enriched with suspended charcoal dust. However, if the off-gas is to be vented to the atmosphere, a cleaning device 50 and/or an incinerator or other suitable gas cleaning system must be utilized to minimize air pollution.

Depending on the type and particle size of the wood materials being carbonized all or most of the product charcoal may be collected at outlet 40 of cyclone 38. If most of the charge is relatively dense such as ebony wood or coconut shell, and is of relatively large particle size such as ¼ inch most of the product charcoal may be permitted to flow off the top of the fluidizing bed at outlet 32.

Figure 2:
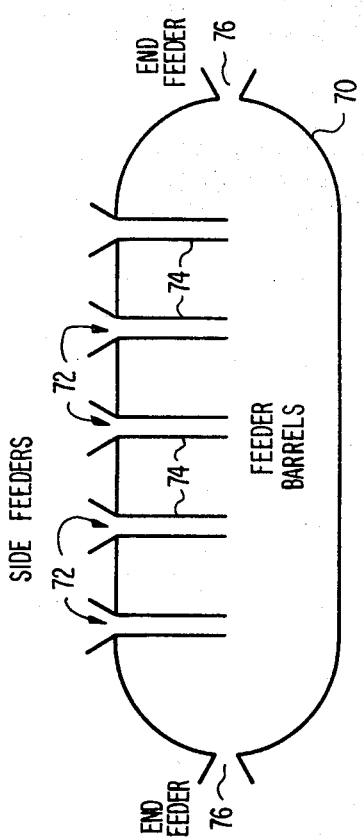
FIG. 2 is a top, sectional schematic view of an alternate fluidizing bed embodiment.

With reference to FIG. 2, as indicated above, if the horizontal bed area extends beyond a horizontal radius approximately equal to the bed depth at the feed inlet to the bed, the said area will be unused, and therefore is superfluous. Accordingly, an oval-shaped bed 70 may be utilized, with a plurality of side entering feeders 72 equipped with barrel extensions 74 provided so that the feed is discharged centrally of the bed. End feeders 76 may also be provided, if desired. The oval bed of FIG. 2 having side entering feeders 72 with extensions 74 will utilize, as the effective bed area, the entire area within the vessel.

Figure 3:
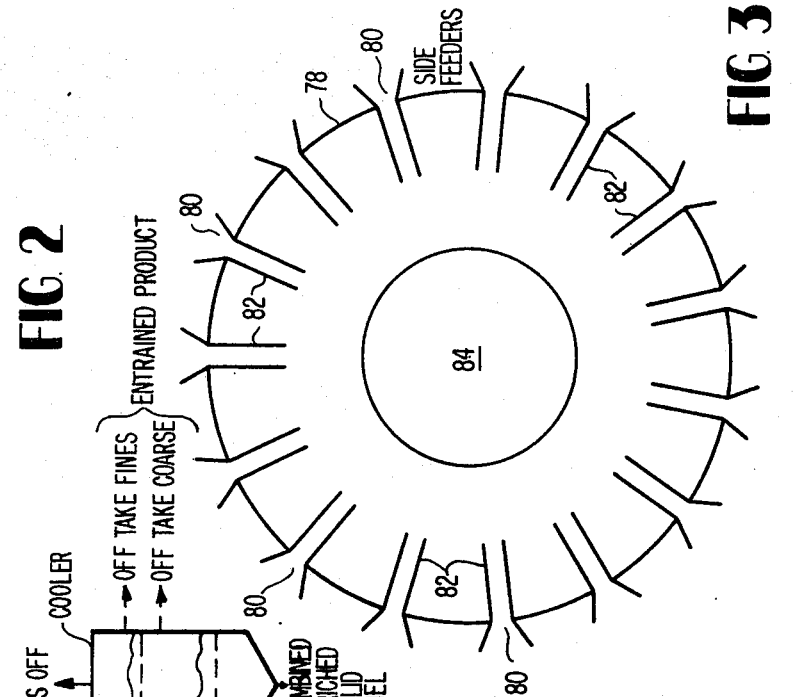
FIG. 3 is a top, sectional schematic view of another alternate fluidizing bed embodiment.

With reference to FIG. 3, if a circular bed 78 is utilized, with side entering feeders 80 equally spaced around the circumference thereof, and if barrel extensions 82 are also implemented, the central portion of the vessel 84 may remain unused depending on the bed depth. Accordingly, an efficient fluidizing bed of circular outer configuration may be toroidal in cross-section.

It will be obvious to those skilled in the art that a wide variety of different shaped beds may be provided which will utilize the maximum area available for carbonization. Such beds may be, as desired, of extended length, or serpentine in cross-section. Although fluidized beds are normally thought of as circular, efficient carbonization with maximum utilization of the bed area available may be achieved with a wide variety of different shaped beds. The opposing vessel walls must, however, be at least 2 feet or more apart so that the wall effect will be negligible, and the distance between feed injectors must not be greater than twice the depth of the bed for efficient space utilization.

For example, if the fluidizing vessel of FIG. 3 has a bed depth of 3 feet, and an inside diameter of 12 feet with twelve injector feeders spaced equidistantly around the circumference, the area 84 will be approximately 6 feet in diameter, and if the vessel 78 were circular is cross-section rather than toroidal, the area 84 would be unused in the carbonization process.

The charcoal from outlets 34 and 40 may then be cooled and conditioned against spontaneous combustion preparatory to use as a fuel. If Pyrochar if formed, it may then be compacted or used as a powdered fuel as described in my patent application Ser. No. 279,767.

In addition, the off-gas from conduit 48 may be passed through the cooled charcoal so that the condensible combustible matter therein is adsorbed on the charcoal as described and claimed in my prior application Ser. No. 271,795 to form an enriched solid fuel, and a non-corrosive fuel gas available for use and/or storage.

In conclusion an efficient continuous process for producing solid or gaseous fuel from particulate woody materials in a fluidized bed and an improved fluidized bed carbonization apparatus has been described. The apparatus of this invention may carbonize at a bed temperature of from about 600°–800°F. to produce Pyrochar; at from about 800°–1200°F. to produce briquette quality charcoal; or at over about 1200°F. to produce low volatile charcoal. In addition an off-gas useful as a fuel may also be produced depending on the moisture content of the feed and the bed temperature.

The process includes the steps of continuously injecting particulate feed material into a fluidized bed of previously carbonized materials; collecting the dispersed phase and separating fine charcoal from the off-gas; collecting a coarser charcoal fraction from the surface of the bed; and collecting coarse, high ash rejects from the bottom of the bed. The coarse and fine charcoal may then be cooled and conditioned for use as a solid fuel. The gas may be recycled for use as a fluidizing medium, used as an enriched fuel gas, or cleaned and stored for use as a fuel. The condensible combustibles in the gas may also be adsorbed onto the cooled charcoal to form an enriched solid fuel and to reduce the corrosiveness of the gas.

The fluidizing bed preferably uses a porous, flat or nearly flat grid and feed is injected into the central portion of the bed over the grid. Although beds of different cross-sectional configurations may be used, for efficient carbonization the feed inlet is disposed between the vertical walls of the bed at a horizontal distance not exceeding the bed depth from each wall.

As will be obvious to those skilled in the art this invention is not intended to be limited to the particular shape of the fluidizing bed, or to the means for separating the fines from the entraining off-gas. Any conventional apparatus is intended to be included within the scope of this invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letter Patent is:

1. A process for carbonizing particulate woody materials to produce a substantially pollution-free solid fuel having a low, relatively nonabrasive ash content comprising the steps of:
providing a dense phase fluidized bed of hot previously carbonized woody materials in a closed vessel having a porous grid immediately below said bed, a plenum chamber below said grid, and a source of heated gas in communication with said chamber, providing a fluidizing combustion supporting medium for said bed;
continuously injecting particulate woody materials small enough to pass through about a ¼ inch screen into substantially the bottom central portion of the dense phase of said bed at at least one feed point spaced substantially equally and horizontally from opposed vertical walls of said vessel and immediately super adjacent said grid;
continuously collecting and removing a dispersed phase of fine charcoal entrained in carbonization offgas above said bed without heating said dispersed phase; and
separating at least a portion of said fine charcoal from said gas, and collecting said charcoal for use as a solid fuel;
continuously collecting and removing a coarse, high ash fraction from the bottom of said bed immediately above said grid.

2. The process of claim 1 further comprising returning at least a portion of said separated off-gas of carbonization to said plenum chamber for recirculation through said bed as a primary fluidizing medium.

3. The process of claim 1 further comprising cooling said collected charcoal and circulating at least a portion of said separated off-gas therethrough whereby the condensible combustibles therein are adsorbed on said charcoal to form an enriched solid fuel.

4. The process of claim 1 further comprising maintaining the dense phase in said bed at a temperature of from about 600° to 800°F. to produce Pyrochar.

5.. The process of claim 1 further comprising maintaining the dense phase in said bed at a temperature of from about 800° to about 1200°F. to produce charcoal of a quality suitable for briquetting.

6. The process of claim 1 further comprising maintaining the dense phase in said bed at a temperature of at least about 1200°F. to produce low volatile charcoal.

7. The process of claim 1 further comprising providing a dense phase fluidized bed having a depth of at least 2 feet.

8. The process of claim 7 further comprising providing a dense phase fluidized bed having a depth of from about 3 feet to about 9 feet.

9. The process of claim 1 further comprising injecting said particulate woody materials into the dense phase of said bed at a location wherein the horizontal distances from the feed inlet material injection portion in said bed to at least two vertical walls of said vessel are no greater than the depth of the dense phase of said bed.

10. The process of claim 1 further comprising continuously collecting and removing a coarse charcoal fraction from the surface of said dense phase for use as a solid fuel.

11. The process of claim 10 further comprising cooling said collected charcoal and circulating at least a portion of said separated off-gas therethrough whereby the condensible combustibles therein are adsorbed on said charcoal to form an enriched solid fuel.

* * * * *

UNITED STATES PATENT AND TRADEMARK OFFICE
CERTIFICATE OF CORRECTION

PATENT NO. : 3,977,947
DATED : August 31, 1976
INVENTOR(S) : Owen Pyle

It is certified that error appears in the above-identified patent and that said Letters Patent are hereby corrected as shown below:

Column 2, line 27, crack should be cracks.
Column 3, line 5, add charcoal after broadly.
Column 4, line 59, will should be well.
Column 4, line 59, In should be It.
Column 5, line 48, said should be side.

Column 7, line 34, high should be higher.

Signed and Sealed this

First Day of February 1977

[SEAL]

Attest:

RUTH C. MASON
Attesting Officer

C. MARSHALL DANN
Commissioner of Patents and Trademarks